UNITED STATES PATENT OFFICE.

CHARLES MACNICHOL, OF WASHINGTON, DISTRICT OF COLUMBIA.

METHOD OF TREATING LIME MATERIALS.

1,151,701.  Specification of Letters Patent.  Patented Aug. 31, 1915.

No Drawing.  Application filed February 24, 1913.  Serial No. 750,123.

*To all whom it may concern:*

Be it known that I, CHARLES MACNICHOL, a citizen of the United States, residing at Washington, in the District of Columbia, have invented new and useful Improvements in Methods of Treating Lime Materials, of which the following is a specification.

This invention relates to the treatment of concrete or other material composed partly or wholly of lime, and has for its object the efficient yet economical treatment of the same preparatory to the painting or other decoration thereof for the purpose of preserving the same and reducing the quantity of materials which would otherwise be required for covering or decorating the same.

It is now recognized that in the setting of Portland cement and other lime compounds, a certain amount of caustic lime is liberated. This free lime inevitably migrates to the surface of the materials when moisture is allowed to penetrate the same, and becomes very active toward ordinary oil-paints and certain varnishes when applied thereto.

Heretofore many attempts have been made to either neutralize the free lime present in the surface of various materials or to insulate the surface so as to preclude the action thereof upon superposed coats of paint or varnish. Owing to the varying conditions met with in practice, few if any of these attempts have been particularly successful, especially with respect to the vital question of cost of treatment.

My experiments and investigations have resulted in the discovery that a remarkably effective yet cheap method of treatment of lime-containing materials can be accomplished by the superficial application thereto of an aqueous solution of a soluble, acid-reacting salt of an insoluble, hydroxid-forming metal in combination with a suitable filler, binder and color indicator, the latter serving to show the portions of the surface of the materials where the said composition, hereinafter termed a primer, has been applied.

In carrying out my invention I preferably proceed as follows: Approximately six pounds of zinc sulfate ($ZnSO_4$) are dissolved in a gallon of water, and to this mixture is added a small amount of a pigment, such for example as two pounds of zinc oxid ground in a solution of glue, for example two pounds of a twenty per cent. glue solution, and preferably when a color indicator is desired the said pigment is treated with a water soluble dye, such as anilin dyes of any desired shade, or in lieu of said zinc oxid a colored pigment filler may be employed. Preferably one or more coats of this primer may be applied and owing to the presence of the color indicator therein the unequal coating of the surface can be avoided, and the painter is enabled to avoid streaks or bare spots such as are often termed "holidays" in the trade.

I am aware that simple solutions of zinc sulfate and similar soluble salts have been proposed for the priming of cement and other lime materials, and have personally published several papers relating thereto. My experience with such mixtures has been that the same are totally defective, particularly for the practical treatment of cement, owing to the deceptive transparency of the same and the consequent difficulty experienced in the even coating of a surface therewith.

The composition employed in the method herein described not only neutralizes the free lime in the surface treated, but the glutinous binder therein serves to retain the suspended pigment in the pores of said surface, thereby effectively filling the same. Moreover, the cement or other lime materials when treated as herein described are rendered far more suitable for the reception of subsequent coats of paint than when such materials are superficially treated with many shellac and varnish sizes heretofore proposed, since the primer employed not only is absorbed into the pores of the material but the contained pigment therein affords an excellent rough foundation for the paint coat and ultimately amalgamates therewith in a permanent bond.

My experiments have demonstrated that cement constructions are materially strengthened when they are treated with solutions of zinc sulfate, and it is believed that this is due to the fact that the insoluble compounds formed, consisting of zinc oxid and calcium sulfate and particularly the latter which has a much greater bulk than calcium oxid, serve to fill up the pores and increase the density or impermeability of the cement treated.

Having thus described my invention, what I claim and desire to secure by Letters Patent is:

1. The method of treating cementitious materials containing free lime, which consists in superficially applying thereto an aqueous solution of an acid reacting salt of a water insoluble-hydroxid-forming metal and containing a glutinous binder and a color indicator including a mineral-oxid filler and a water soluble dye in suspension in said solution.

2. A composition of matter consisting of cement having its surface portion impregnated with zinc oxid, calcium sulfate, a pigment and a glutinous binder, said calcium sulfate being present in such surface portion in substantial excess of the amount contained in the body of said cement and said impregnated surface portion being artificially colored by an indicator including a water soluble dye.

3. In the process of painting cement concrete the steps which consist in first superficially applying thereto an aqueous solution of an acid-reacting salt of a water-insoluble-hydroxid-forming metal and containing a glutinous binder and a pigment in suspension in said solution, and then superficially applying an oil paint coat directly to said treated surface whereby an intimate and permanent bond between said paint coat and said treated surface is obtained.

Signed this 21st day of February, 1913, at Washington, District of Columbia.

CHARLES MACNICHOL.

Witnesses:
P. H. BUTLER,
A. H. SWENARTON.